US011733555B2

(12) United States Patent
Vogt et al.

(10) Patent No.: US 11,733,555 B2
(45) Date of Patent: Aug. 22, 2023

(54) ELECTRO-OPTIC MODULATOR

(71) Applicant: QUBIG GMBH, Munich (DE)

(72) Inventors: Enrico Vogt, Munich (DE); Daniel Pertot, Munich (DE)

(73) Assignee: QUBIG GMBH, Munich (DE)

( * ) Notice: Subject to any disclaimer, the term of this patent is extended or adjusted under 35 U.S.C. 154(b) by 0 days.

(21) Appl. No.: 16/954,965

(22) PCT Filed: Dec. 18, 2018

(86) PCT No.: PCT/EP2018/085707
§ 371 (c)(1),
(2) Date: Jun. 17, 2020

(87) PCT Pub. No.: WO2019/121825
PCT Pub. Date: Jun. 27, 2019

(65) Prior Publication Data
US 2020/0379280 A1  Dec. 3, 2020

(30) Foreign Application Priority Data
Dec. 19, 2017  (EP) ..................................... 17208663

(51) Int. Cl.
*G02F 1/03* (2006.01)
(52) U.S. Cl.
CPC .................. *G02F 1/0344* (2013.01)
(58) Field of Classification Search
CPC ........ G02F 1/03; G02F 1/0344; G02F 1/0356; G02F 1/0316; G02F 1/0353;
(Continued)

(56) References Cited

U.S. PATENT DOCUMENTS 3,133,198 A   5/1964  Kaminow et al.
3,406,356 A   10/1968 Peters
(Continued)

FOREIGN PATENT DOCUMENTS

DE   34 15 523 A1   10/1985
GB   1 192 394 A    5/1970

OTHER PUBLICATIONS

McMeekin et al, "The Transverse Electrooptic Modulator (TEOM): Fabrication, Properties, and Applications in the Assessment of Waveguide Electrooptic Characteristics"; Journal of Lightwave Technology, vol. 10, No. 2, Feb. 1992; p. 163 (Year: 1992).*
(Continued)

*Primary Examiner* — Jie Lei
(74) *Attorney, Agent, or Firm* — Lewis Roca Rothgerber Christie LLP

(57) ABSTRACT

An electro-optic modulator for modulating a beam of electro-magnetic radiation having a beam path and a beam axis is of a transverse type and comprises: a modulator element that is positioned in the beam path, a housing for receiving the modulator element, which housing forms a resonant cavity, and a coupling device for inputting modulating energy into the housing such that a resonant standing wave is generated within the housing. The housing comprises at least one sidewall that extends substantially parallel to the beam axis over a length, wherein the at least one sidewall comprises a deformed portion such that in the resonant cavity a distance between the sidewall and the beam axis in a direction perpendicular to the beam axis varies over at least a portion of the length of the sidewall.

19 Claims, 10 Drawing Sheets

(58) Field of Classification Search
CPC ...... G02F 1/0305; G02F 1/225; G02F 1/2255;
G02F 1/2257; H01S 3/107; H01S 3/115;
H01S 3/0085; G02B 6/14
USPC ....... 359/245, 254, 237, 247, 275–279, 323,
359/322, 315; 372/12, 26, 28; 398/116,
398/117
See application file for complete search history.

(56) References Cited

U.S. PATENT DOCUMENTS

| | | | |
|---|---|---|---|
| 3,429,637 A | | 2/1969 | Wentz |
| 3,432,224 A | * | 3/1969 | Myers .................. G02F 1/0344 359/251 |
| 4,849,719 A | * | 7/1989 | Belek .................... G02F 1/0305 359/254 |
| 5,414,552 A | | 5/1995 | Godil |
| 8,995,838 B1 | | 3/2015 | Schaffner et al. |
| 2007/0025656 A1 | | 2/2007 | El-Sherif |

OTHER PUBLICATIONS

International Search Report and Written Opinion of corresponding PCT/EP2018/085707, dated May 23, 2019, 19 pages.

* cited by examiner

ELECTRO-OPTIC MODULATOR

CROSS-REFERENCE TO RELATED APPLICATION(S)

This application is a National Phase Patent Application of International Patent Application Number PCT/EP20181085707, filed on Dec. 18, 2018, which claims priority of European Patent Application No, 17208663.9, filed Dec. 19, 2017, the entire contents of both of which are incorporated herein by reference.

The present invention relates to a resonant standing wave electro-optic modulator (EOM) for modulating a beam of electro-magnetic radiation.

EOMs are configured to modify for example the phase or the frequency or the polarization or the amplitude of a laser beam. They are used in a variety of applications, such as optical communication and scientific instruments. A resonant standing wave electro-optic modulator comprises a housing with a block of a crystalline electro-optic material arranged therein. The housing forms a resonant cavity for a standing wave of a modulating energy, for example microwave energy, that causes a change in the refractive index of the crystalline material. The microwave energy typically is phase-matched or quasi-phase matched with the laser radiation to be modulated.

The modulating energy is generally introduced into the housing by a coupling element, such as a rod or a pin that extends into the cavity. However, the coupling element itself may cause field distortions of the modulating energy that can lead to a decrease in modulation efficiency and/or a distortion of the modulated laser beam profile and/or a deflection of the modulated laser beam.

A resonant standing wave electro-optic modulator for a beam of laser radiation is known from U.S. Pat. No. 5,414,552. It has been found that for microwave frequencies greater than 6 GHz the known electro-optic modulator may exhibit deficiencies in the standing wave modulating field. This may be due to dimensional constraints relating to the crystalline block and/or the rod.

It is therefore an object of the invention to provide an alternative or an improved electro-optic modulator, in particular for applications with higher frequencies, such as frequencies greater than 6 GHz, in particular greater than 7 GHz.

The object is obtained by an electro-optic modulator according to claim 1 or claim 13 and a method of producing an electro-optic modulator according to claim 12. Further developments of the invention are indicated in the dependent claims, respectively. The method may also be further developed by the features that are indicated below or in the dependent claims of the devices or vice versa, or the features of the devices might also be used for further developing each other.

In one embodiment of the invention, an electro-optic modulator is provided for modulating a beam of electro-magnetic radiation having a beam path and a beam axis, wherein the electro-optic modulator comprises a modulator element that is positioned in the beam path, a housing for receiving the modulator element that forms a resonant cavity and a coupling device for inputting modulating energy into the housing such that a resonant standing wave is generated within the housing. The housing comprises at least one sidewall that extends substantially parallel to the beam axis over a length and the at least one sidewall comprises a deformed portion such that in the resonant cavity a distance between the sidewall and the beam axis in a direction perpendicular to the beam axis varies over at least a portion of the length of the sidewall. Preferably, the coupling device for inputting modulating energy into the housing is a rod-shaped element. The electro-optic modulator is of a transverse type, that is, the electric field vector of the modulating energy is oriented transverse, preferably perpendicular, to the beam axis. Preferably, the housing is substantially cuboid-shaped, except for the deformed portion(s) of the sidewall(s).

Preferably, the resonant cavity formed by the housing is a single-cavity structure and not a multi-cavity structure, i.e. the resonant cavity is formed of a single cavity and not of several interconnected cavities.

By providing at least one sidewall with a deformed portion, the standing wave field of modulating energy within the housing can be optimized, in particular distortions of the standing modulating wave field can be reduced or compensated. This may improve the performance and efficiency of the electro-optic modulator. Distortions of the modulating wave field can be, for example, a displacement of nodes of the standing wave field of modulating energy, such as microwave energy, along the beam axis and/or a displacement of the electric field anti-node perpendicular to the beam axis and/or a reduced peak field strength.

According to an aspect of the invention, the coupling device is provided within a deformed portion in such a manner that the coupling device is arranged beyond a lateral extension of a sidewall away from the beam axis. By doing so, an optimal coupling at higher frequencies of the modulating wave can be achieved. In particular frequencies of the modulating wave greater than 6 GHz, more preferably greater than 7 GHz can be applied. Frequencies up to 18 GHz or more may be achieved.

According to another aspect of the invention, the deformed portion of the at least one sidewall reduces the effective length of the modulator element, providing for adjustment of the effective length without modifying the modulator element itself.

In another embodiment of the invention, an electro-optic modulator for modulating a beam of electro-magnetic radiation having a beam path and a beam axis is provided, wherein the electro-optic modulator comprises a modulator element that is positioned in the beam path, a housing for receiving the modulator element and which housing defines a resonant cavity, a coupling device for inputting modulating energy into the housing such that a resonant standing wave is generated within the housing and an impedance matching element that comprises a first end, wherein a distance between the first end of the impedance matching element and the coupling device can be adjusted. The electro-optic modulator is of a transverse type, that is, the electric field vector of the modulating energy is oriented transverse, preferably perpendicular, to the beam axis. Preferably, the coupling device for inputting modulating energy into the housing is a rod-shaped element.

The impedance matching element allows for an improved, in particular simpler and/or more exact, matching of the impedance of the modulator element to the impedance of a feed line for supplying modulating energy and/or for an improved, in particular more efficient, coupling of the modulating energy into the housing.

In yet another embodiment of the invention, a method for adapting the impedance of the modulator element of the electro-optic modulator is provided, wherein the electro-optic modulator comprises an impedance matching element and wherein the distance between the first end of the impedance matching element and the coupling device is chosen such that the impedance of the modulator element substantially matches an impedance of a feed line for supplying modulating energy.

Further features and advantages of the invention will become clear from the description of embodiments which will be described by making reference to the drawings. It should be noted that the drawings are not necessarily drawn to scale. Of the drawings, FIG. 1 is a schematic perspective illustration of a resonant standing wave electro-optic modulator.

FIG. 2 schematically shows a section through the electro-optic modulator shown in FIG. 1 in a direction perpendicular to an incident light beam.

FIG. 3a is a schematic cross-sectional view in the x-y-plane of a portion of a resonant standing wave electro-optic modulator according to a first embodiment of the invention.

FIG. 3b schematically shows a section through the electro-optic modulator shown in FIG. 3a in a direction perpendicular to an incident light beam.

FIG. 4 schematically depicts the electric field strength in z-direction $E_z$ of the standing microwave field along the beam axis within the electro-optic modulator shown in FIG. 3a to illustrate a first example of field distortions that can be compensated for by the invention, wherein FIG. 4 is a schematic cut through the standing microwave electric field shown in FIG. 6 along the beam axis.

FIG. 5 is a schematic cross-sectional view in the x-y-plane of a portion of a resonant standing wave electro-optic modulator according to a second embodiment of the invention.

FIG. 6 schematically depicts the standing microwave electric field within the electro-optic modulator shown in FIG. 3a to illustrate a second example of field distortions that can be compensated for by the invention.

Figure 1:
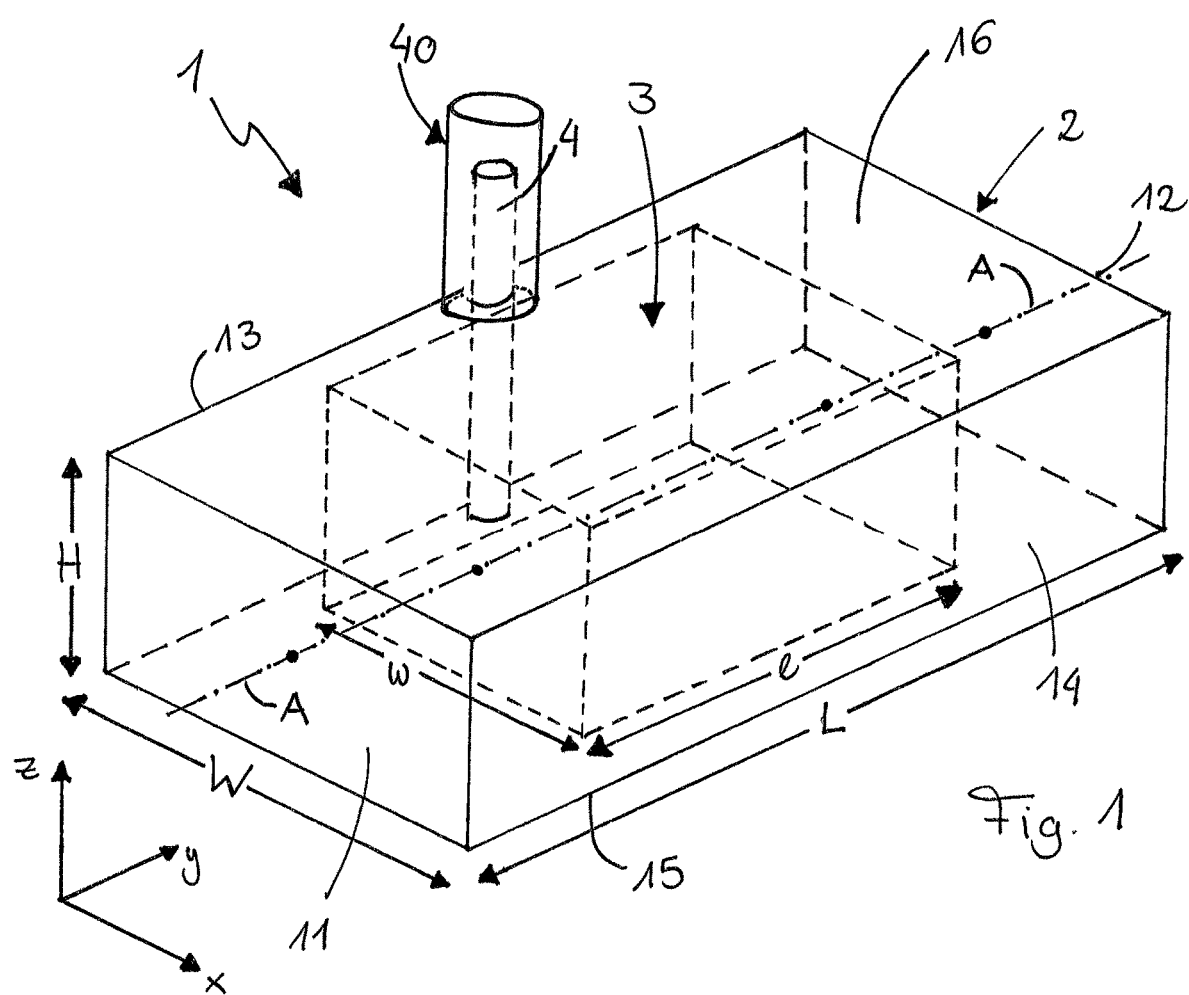
Figure 2:
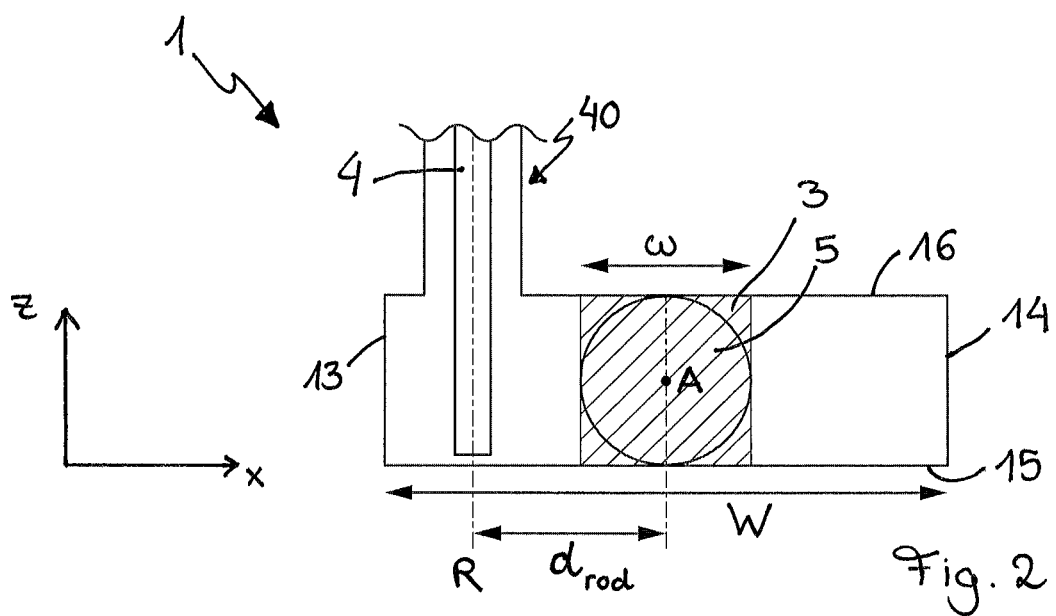

FIG. 1 and FIG. 2 show general schematic views of a resonant standing wave electro-optic modulator 1. The electro-optic modulator 1 includes a housing 2 that forms a resonant cavity for a modulating energy such as a microwave energy. A modulator element in the form of a block 3 of a crystalline material is provided inside the housing 2. The crystalline material is preferably a monocrystalline electro-optic material that is configured to change its refractive index with an applied electric field. For example, LiNbO$_3$ (lithium niobate) or LiTaO$_3$ (lithium tantalate) may be used.

The housing 2 is substantially rectangular having four sidewalls provided by a top wall 16 and an opposite bottom wall 15 and two opposite lateral walls 13, 14, as well as a front face 11 and an opposite rear face 12. The term "opposite" here means that the walls are located opposite from one another with the block 3 of crystalline material located between them. The front and rear faces 11, 12 are configured to allow a beam of electromagnetic radiation, in particular a laser beam to pass therethrough, for example, they can include optical windows to let the laser beam pass. The walls 11, 12, 13, 14, 15, 16 of the housing 2 are preferably made of a material having a high electrical conductivity, such as a metal. Thus, the housing 2 is substantially cuboid-shaped, except for deformed portions of the walls, which will be described later.

The housing 2 defines a resonant cavity having a width W, a height H and a length L, wherein the volume W×H×L of the resonant cavity is selected to support a resonant standing wave of the modulating microwave energy within the same when it includes the crystalline block 3. The width W defines an x-direction and the length L defines a y-direction and the height H defines a z-direction of an orthogonal coordinate system.

The block 3 has a length l in the y-direction, wherein the length l of the crystalline block is preferably smaller than the length L of the resonant cavity formed by the housing 2. Further, the block 3 has a width w in the x-direction, wherein the width w of the crystalline block is preferably smaller than the width W of the resonant cavity. The height of the block 3 is preferably the same as the height H of the resonant cavity. Hence, crystalline block 3 is arranged in the housing 2 such that it is spaced apart from the lateral walls 13, 14, thus forming a space between each of the lateral walls 13, 14 and the crystalline block 3.

The front and end sections of the cavity formed by the housing 2 that extend beyond the length l of the crystalline block 3 are cutoff sections. This means that with the parameters chosen properly, the microwave at the desired resonance frequency can propagate along the beam axis A in the crystal-filled region, i.e. in block 3, but it cannot propagate in the cutoff sections. Instead, there, the field strength decays exponentially.

Furthermore, a rod 4 is provided that extends into the housing 2 from above, i.e. through the top wall 16 of the housing 2, to or almost to the bottom wall 15 of the housing 2. The rod 4 extends into the space formed between the lateral wall 13 and the crystalline block 3 (see also FIG. 2) and is spaced apart from the lateral wall 13. It extends substantially parallel to the height H of the resonant cavity, i.e. its rod axis R (shown in FIG. 2) is substantially parallel to the z-direction, and serves as a coupling element for introducing the microwave energy into the resonant cavity formed by the housing 2. The microwave energy is delivered via a feed line, such as a coaxial feed line 40, wherein the rod 4 can form a part of the feed line. The rod 4 acts substantially as a loop coupler together with the sidewalls of the housing 2. The electric field of the microwave energy is applied transverse, specifically perpendicular, to the beam axis A (see below), that is, the electric field (electric field vector) of the resonant standing wave of the modulating microwave energy extends transverse, specifically perpendicular, to the beam axis A (see also FIGS. 4 and 6). Consequently, the electro-optic modulator 1 is of a transverse type.

In order to modulate a beam of laser light, the beam (not shown in FIG. 1) enters the housing 2 through the front face 11 and passes the entire length l of the crystalline block 3. The modulated laser beam then exits the housing 2 through the rear face 12. The beam has a beam axis A which is preferably parallel to the y-axis, i.e. the length L of the resonant cavity formed by the housing 2, and is thus parallel to the sidewalls 13, 14, 15, 16 of the housing 2. The beam axis A preferably passes centrally through the housing 2, i.e. the beam axis is equally spaced apart from opposite lateral walls 13 and 14 and from the top and bottom walls 16, 15.

The block 3 of crystalline material is designed to receive substantially the entire incoming laser beam i.e. its cross-section perpendicular to its length l is dimensioned and shaped such that substantially the entire cross-section 5 of the incoming laser beam lies within the cross-section of the crystalline block 3 as shown in FIG. 2. Due to an optical aperture the laser beam passes, such as an optical window provided in the front face 11 of the housing 2, the cross-section 5 of the laser beam is typically disk shaped, preferably with a circular cross-section with its beam axis A located in the center of the disk and extending perpendicular to the cross-section 5, i.e. into the drawing plane in FIG. 2. The beam axis A preferably passes centrally through the cross-section of the crystalline block 3.

The rod 4 is positioned in the cavity between the lateral wall 13 and the crystalline block 3 at a lateral position along the x-axis with a distance $d_{rod}$ between the rod axis R and the beam axis A. The distance $d_{rod}$ between the rod axis R and the beam axis A is chosen such that an optimal coupling to the standing microwave field is provided in order to achieve a maximum modulation efficiency. For a given rod diameter the optimal lateral position, i.e. the optimal distance $d_{rod}$ between the rod axis R and the beam axis A, depends on the crystalline material of block 3 as well as on the modulation frequency of the microwave energy. At low frequencies the optimal pin position lies inside the housing 2 as shown in FIG. 1 and FIG. 2, i.e. the distance between the lateral wall 13 and the beam axis A exceeds the distance $d_{rod}$ between the rod axis R and the beam axis A. However, at higher frequencies, e.g. for frequencies greater than 6 GHz, preferably greater than 7 GHz for lithium niobate, it may be advantageous for an optimal coupling to move the rod 4 beyond the lateral wall 13 of the housing 2 for practical and/or reasonable rod diameters, i.e. the distance $d_{rod}$ between the rod axis R and the beam axis A exceeds the distance between the lateral wall 13 and the beam axis A.

Figure 3A:
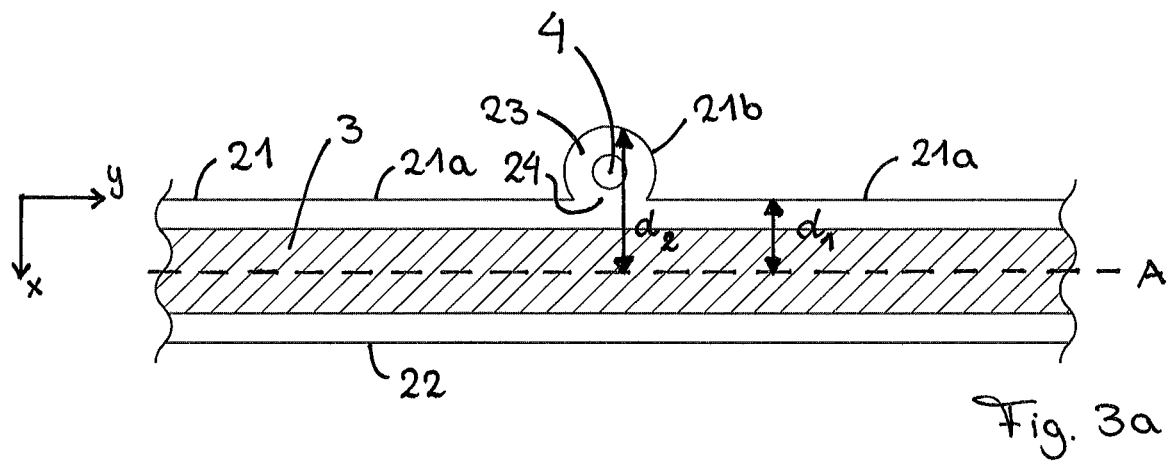
Figure 3B:
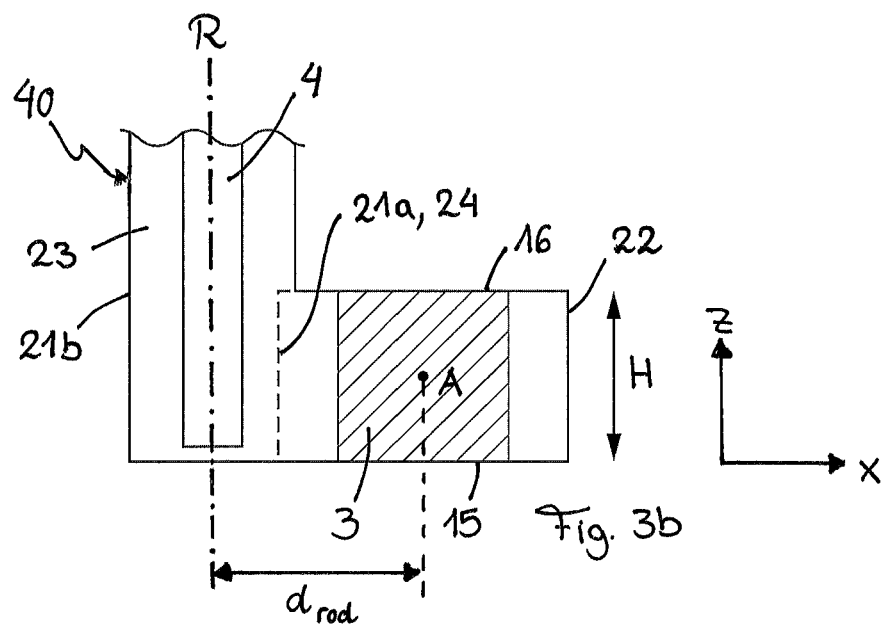

This is depicted in FIGS. 3a and 3b, which show a portion of a resonant standing wave electro-optic modulator 1 according to a first embodiment of the invention. FIG. 3a shows a cross-section of the housing 2 in the x-y-plane and FIG. 3b shows a cross-section of the same in the x-z-plane at the position of the rod 4.

In FIGS. 3a and 3b, the beam axis A passes through the crystalline block such that the opposite lateral walls 21 and 22 and the opposite top and bottom walls 16, 15 are equally spaced apart from the beam axis A, respectively. The lateral wall 21 that is closest to the rod 4 (the lateral wall 13 in FIGS. 1 and 2) comprises a deformed portion 21b and non-deformed, i.e. regular portions 21a. The regular portions 21a extend substantially parallel to the beam axis A. The deformed and regular portions 21b, 21a of the wall 21 are arranged along the length L of the lateral wall 21 such that the inner surface of the deformed portion 21b is closer to the rod than the inner surface of the regular portions 21a. The deformed portion 21b is substantially cylindrical shaped with the length of the cylinder extending along the height H of the lateral wall 21, i.e. the deformed portion 21b is substantially disk-shaped in the cross-sectional view shown in FIG. 3a (i.e. in the x-y-plane). Preferably, the deformed portion 21b is essentially an extension of the coaxial feed line 40. The deformed portion 21b forms a cavity 23, i.e. a recess, that is connected with the space provided between the crystalline block 3 and the lateral wall 21 via a coupling opening 24 and the rod 4 is provided within the cavity 23. The deformed portion 21b of the lateral sidewall 21 thus has a second distance $d_2$ from the beam axis A, which second distance $d_2$ varies along the deformed portion 21b. The regular portions 21a have a first distance $d_1$ from the beam axis A, wherein the second distance $d_2$ of the deformed portion 21b exceeds the first distance $d_1$ of the regular portions 21a.

Besides allowing for higher microwave frequencies of the standing microwave field provided within the housing 2, providing the rod 4 beyond the lateral wall 13, i.e. within the cavity 23 formed by the deformed portion 21b may also result in an increase of the standing wave field strength, which is proportional to the modulation efficiency. Furthermore, the rod 4 itself constitutes a perturbation of the standing wave field in its vicinity, which causes field distortions that become more and more significant the closer the rod 4 is to the crystalline block 3. Thus, by providing the rod 4 beyond the lateral wall 13, field distortions can be reduced because of a larger distance between rod 4 and crystalline block 3.

However, even when provided beyond the lateral wall 13, the coupling rod 4 itself as well as the coupling opening 24 affect the standing wave of microwave energy sustained within the housing 2 and within the crystalline block 3. Examples of field distortions will be given in the following with reference to FIGS. 4 and 6.

Ideally, the nodes of the standing microwave field are equally spaced along the length l of the crystalline block 3, and the width w of the crystalline block 3 and the width W of the resonant cavity formed by the housing 2 are chosen such that the spacing between the nodes just matches the distance that the light travels along the beam path A within the crystal during one half period of the microwave oscillation (phase-matching). The coupling opening 24 however causes a local modification of the effective microwave wavelength in the waveguide (housing 2), i.e. a field distortion. The coupling opening 24 locally widens the housing 2, thus locally reducing the wavelength of the standing wave field and pulling in the adjacent field nodes towards the coupling opening 24, away from their ideal positions.

Figure 4:
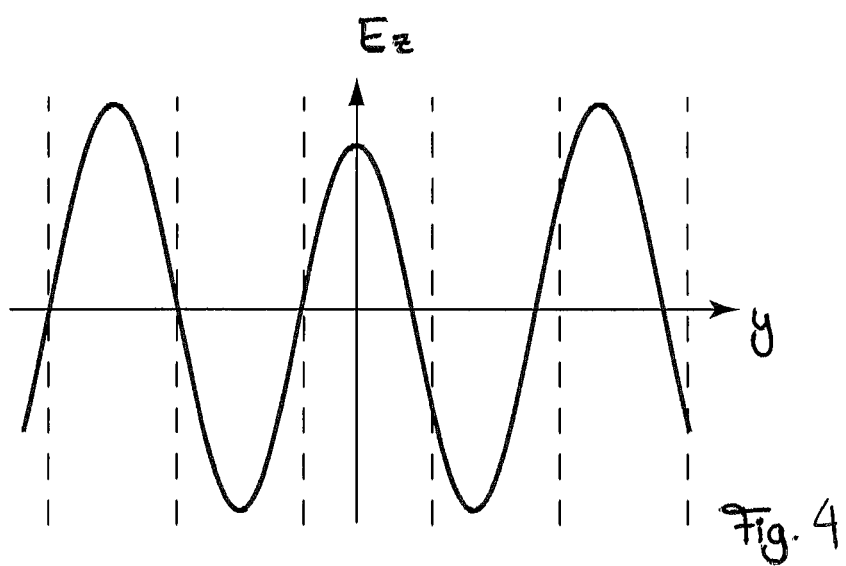

An example of this effect is depicted by FIG. 4, which shows the electric field strength of the standing microwave field along the beam axis A with the rod placed in the center (i.e. at y=0), The dashed vertical lines indicate the ideal, phase-matched positions of the nodes. It can be seen that once the light passes the position of the rod 4 a phase slip in the phase-matching occurs, reducing the efficiency of the modulator.

This effect can be compensated for by locally deforming opposing lateral walls 21, 22 such that the resonant cavity formed by the housing 2, i.e. the waveguide, is locally narrowed in a direction perpendicular to the beam axis A around the rod 4, i.e. before and after the rod 4 along the beam axis A.

Figure 5:
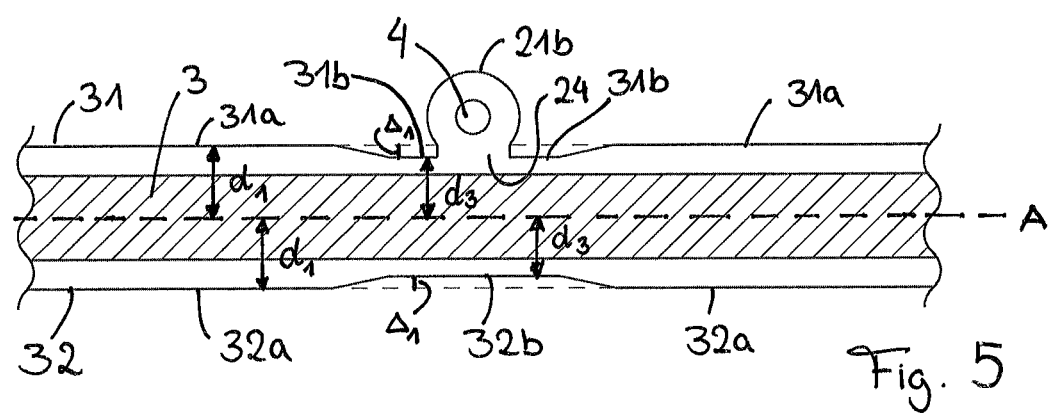

This is depicted by FIG. 5, which shows a portion of an electro-optic modulator 1 with opposing lateral walls 31 and 32 that each comprise non-deformed, i.e. regular portions 31a and 32a having a first distance $d_1$ from the beam axis A. The deformed portion 21b for accommodating the rod 4 forms part of the lateral wall 31. Furthermore, the lateral walls 31, 32 each comprise deformed portions 31b, 32b in the vicinity of rod 4, i.e. before and after the rod 4 along the beam axis A. The deformed portions 31b, 32b are both displaced by an amount $\Delta_1$ from the regular portions 31a, 32a towards the beam axis, such that the distance $d_3 = d_2 - \Delta_1$ between the deformed portions 31b, 32b and the beam axis A is smaller than the first distance $d_1$ between the regular portions 31a, 32a and the beam axis. As the deformed portions 31b, 32b are displaced in opposite directions, they cause the resonant cavity formed by the housing 2 to locally narrow in a direction perpendicular to the beam axis A and perpendicular to the rod 4, i.e. perpendicular to the rod axis R.

Locally narrowing the waveguide compensates the effect of locally widening the waveguide due to the coupling opening 24. Depending on the length l of the crystalline block 3, it may be necessary to locally widen the waveguide instead of locally narrowing it. In general, by locally adjusting the width W of the housing 2 it is possible to pull in or push out the nodes of the standing wave, for example in order to reduce, preferably avoid any phase slips.

Figure 6:
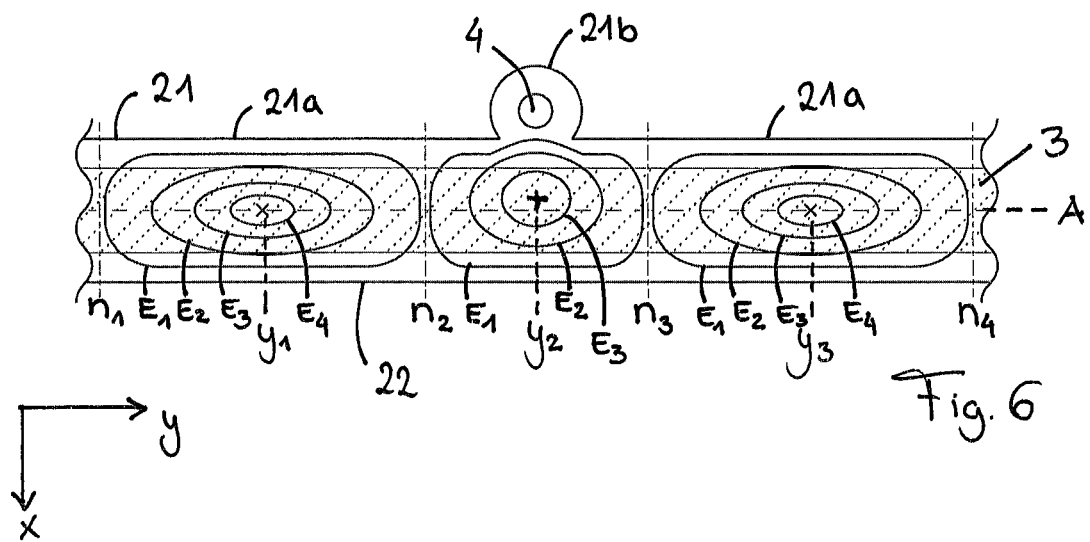

A second example of field distortions introduced by the rod 4 or coupling opening 24 is depicted by FIG. 6, which schematically shows lines of constant electric field strength $E_z$ (isolines) within the electro-optic modulator shown in FIG. 3a.

FIG. 6 schematically shows three peaks, i.e. anti-nodes, of the standing wave, wherein a first anti-node at a first position $y_1$ along the beam axis A is located before the rod 4 (i.e. to the left of the rod in FIG. 6) and a third anti-node at a third position $y_3$ along the beam axis A is located after the rod 4 (i.e. to the right of the rod in FIG. 6). The first and third anti-nodes each comprise isolines $E_1$, $E_2$, $E_3$, $E_4$ with increasing field strength from $E_1$ to $E_4$. A second anti-node at a second (central) position $y_2$ along the beam axis A is located closest to the rod 4 and comprises isolines $E_1$, $E_2$, $E_3$. The nodes $n_1$, $n_2$, $n_3$, $n_4$ between the anti-nodes are schematically shown by dashed lines in FIG. 6. The position of the minimum or maximum of $E_z$ of each anti-node is marked by "x" (first and third anti-nodes) or by "+" (second, central anti-node), wherein "+" denotes a maximum and "x" denotes a minimum.

As can be seen from FIG. 6, the distance between the nodes $n_2$ and $n_3$ adjacent to the second (central) anti-node is shorter than the distance between the nodes $n_1$ and $n_2$ adjacent to the first anti-node and between the nodes $n_2$ and $n_3$ adjacent to the third anti-node. Furthermore, the maximum field strength isoline $E_3$ of the second (central) anti-node is smaller than the maximum field strength isoline $E_4$ of the first anti-node and the third anti-node, which are located further away from the coupling opening 24. A third effect is the lateral displacement of the second (central) anti-node towards the coupling opening 24, i.e. the field "leaks" into the coupling opening 24 as depicted in FIG. 6. In particular, the maximum field strength of the second anti-node, denoted by the "+" sign, is not located on the beam axis A but is shifted towards the coupling opening 24.

In summary, the field distortions caused by the rod 4 and coupling opening 24 depicted in FIG. 6 typically comprise a reduced distance between nodes, a reduced peak field strength and a displacement of the anti-node in a direction perpendicular to the beam axis A.

The lateral displacement of the electric field anti-node away from the beam axis A at the position of the rod 4 can lead to an undesired high-frequency deflection and distortion of the beam profile of the laser beam to be modulated.

Figure 7:
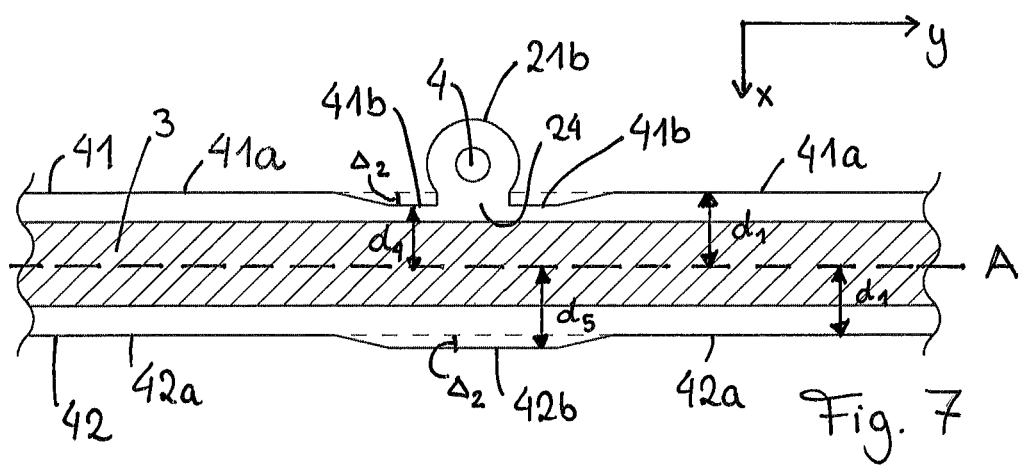
FIG. 7 is a schematic cross-sectional view in the x-y-plane of a portion of a resonant standing wave electro-optic modulator according to a third embodiment of the invention.

FIG. 7 shows a portion of an electro-optic modulator 1 with opposing lateral walls 41 and 42 that each comprise non-deformed, i.e. regular portions 41a and 42a having a first distance $d_1$ from the beam axis A. The deformed portion 21b for accommodating the rod 4 forms part of the lateral wall 41. Furthermore, the lateral walls comprise deformed portions 41b, 42b in the vicinity of rod 4, i.e. before and after the rod 4 along the beam axis A. The deformed portions 41b, 42b each are displaced by an amount $\Delta_2$ from the regular portions 41a, 42a in a direction perpendicular to the beam axis A away from the rod 4, i.e. the deformed portion 41b is displaced towards the beam axis A and the deformed portion 42b is displaced away from the beam axis A. Thus, the deformed portions 41b, 42b are displaced in the same direction.

Consequently, the distance $d_4 = d_1 - \Delta_2$ between the deformed portion 41b of the lateral wall 41 adjacent to the rod 4 and the beam axis A is smaller than the first distance $d_1$ between the regular portion 41a and the beam axis A. The distance $d_5 = d_1 + \Delta_2$ between the deformed portion 42b of the lateral wall 42 opposite the rod 4 and the beam axis A is larger than the first distance $d_1$ between the regular portion 42a and the beam axis A. The deformed portions 41b, 42b thus cause the housing 2 to be locally displaced away from the rod 4 in a direction perpendicular to the beam axis A.

Locally displacing the sidewalls 41, 42 of the housing 2, as shown in FIG. 7, can compensate for the effect of lateral displacement of the electric field maximum away from the beam axis A, which is depicted in FIG. 6.

Locally adjusting the width W of the housing 2 (i.e. the lateral walls 31, 32 move in opposite directions) as shown in FIG. 5 and locally displacing the lateral walls of the housing 2 (i.e. both lateral walls 41, 42 move in the same direction) have been described as two separate modifications of the housing 2. In practice, however, the two modifications will be combined so as to obtain a total displacement of lateral walls 21, 22. The total lateral displacement of the lateral walls 21, 22 can be expressed in terms of the two parameters local waveguide width and local waveguide displacement, which parameters can be optimized numerically by means of simulations of the electro-magnetic field in order to minimize the longitudinal (along the beam axis A) and lateral (perpendicular to the beam axis A) field distortions caused by the coupling mechanism, i.e. the rod 4 and coupling opening 24.

In general, according to the invention, distortions of the standing microwave field caused by the coupling mechanism (in particular, the rod and/or coupling opening) are compensated or at least reduced by locally (re-)shaping the sidewalls of the housing 2, in order to maximize the modulation efficiency of the EOM and/or minimize beam distortions. In the embodiments described above, the lateral sidewalls 13, 14 are locally deformed in a direction perpendicular to the beam axis A at positions that are located in the vicinity of the rod 4 along the beam axis A. However, within the scope of the invention, it is also possible to (re-)shape top and bottom walls 15, 16 and/or front and rear faces 11, 12 of the housing 2 and/or to (re-)shape the sidewalls at positions that are not in the vicinity of the rod. Examples are given below with respect to FIGS. 8a to 9d.

Figure 8A:
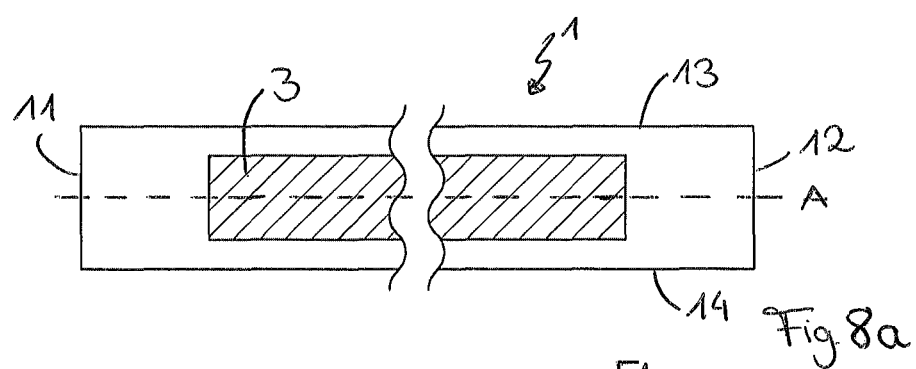
FIG. 8a is a schematic cross-sectional view in the x-y-plane of a resonant standing wave electro-optic modulator without deformed end sections and FIG. 8b is a schematic cross-sectional view in the x-y-plane of a resonant standing wave electro-optic modulator with deformed end sections according to a fourth embodiment of the invention.
Figure 8B:
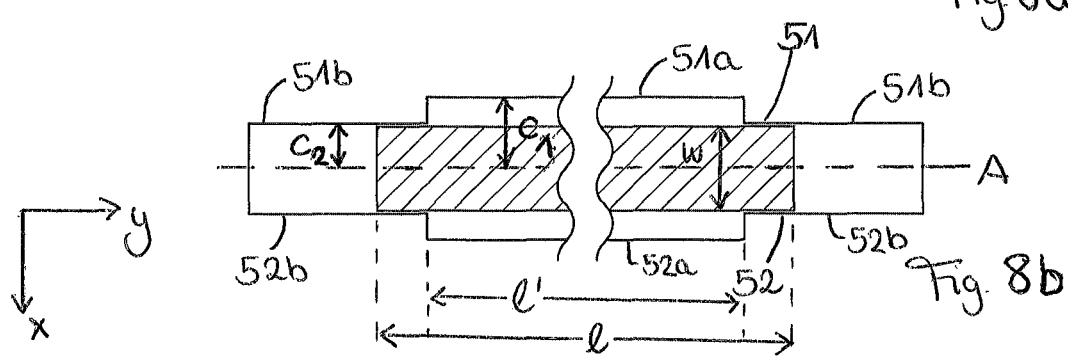

FIG. 8a shows a section through the housing 2 of an electro-optic modulator in the x-y-plane along the beam axis A, wherein the central portion that comprises the rod 4 is omitted for the sake of simplicity. The housing comprises sidewalls 13, 14 that can comprise deformed portions around the rod (i.e. in the omitted portion) as described above. FIG. 8b shows the electro-optic modulator of FIG. 8a with lateral walls 51, 52 that each comprise regular (non-deformed) portions 51a, 52a having a first distance $c_1$ from the beam axis A and deformed portions 51b, 52b having a second distance $c_2$ from the beam axis A. The second distance $c_2$ is selected such that it is substantially equal to half the width w of the crystalline block 3, i.e. $c_2 = w/2$. In this embodiment, the regular portions 51a, 52a are located in the central portion (i.e. in the vicinity of the rod 4) along the beam axis A and the deformed portions 51b, 52b are located in the vicinity of the end portions of the crystalline block 3.

In this embodiment, the width W of the resonant cavity formed by the housing 2 is narrowed down to the width w of the crystalline block 3 in the deformed portions 51b, 52b such that the space formed between the crystalline block 3 and the lateral walls 51, 52 extends over a length l' along the beam axis A that is smaller than the length l of the crystalline block 3. As a result, the standing microwave field cannot propagate into the cutoff sections of the housing 2 formed by the deformed portions 51b, 52b of the lateral walls 51, 52. Consequently, the effective length l' of the crystalline block 3 can be reduced without modifying the length l of the crystalline block 3 itself. The length l' of the block determines the resonance frequency and node spacing of the standing microwave field, among other things.

The shape of the cutoff sections of the housing 2 is not limited to the shape shown in FIG. 8b, For example, the cutoff sections can widen again towards the front and/or rear face 11, 12, i.e. the width of the cutoff sections (i.e. the first distance $c_1$ between the deformed portions 51b, 52b and the beam axis A) does not have to be constant. Moreover, the cutoff sections can also be provided by (re-)shaping the top and bottom walls 15, 16 and/or the front and rear faces 11, 12 of the housing 2 instead or in addition to (re-)shaping lateral walls 51, 52.

Figure 9A:
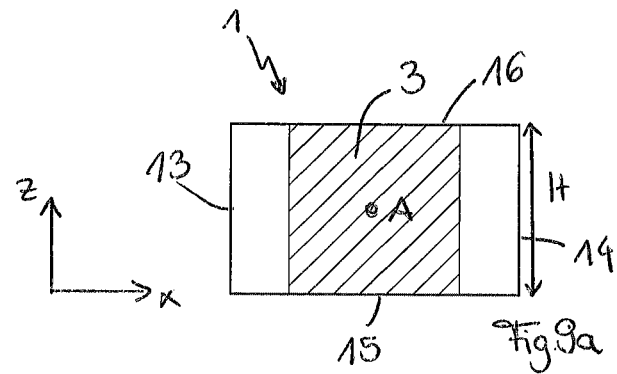
FIG. 9a is a schematic cross-sectional view in the x-z-plane of a resonant standing wave electro-optic modulator with constant height and FIGS. 9b to 9d are schematic cross-sectional views of resonant standing wave electro-optic modulators according to a fifth embodiment of the invention.
Figure 9B:
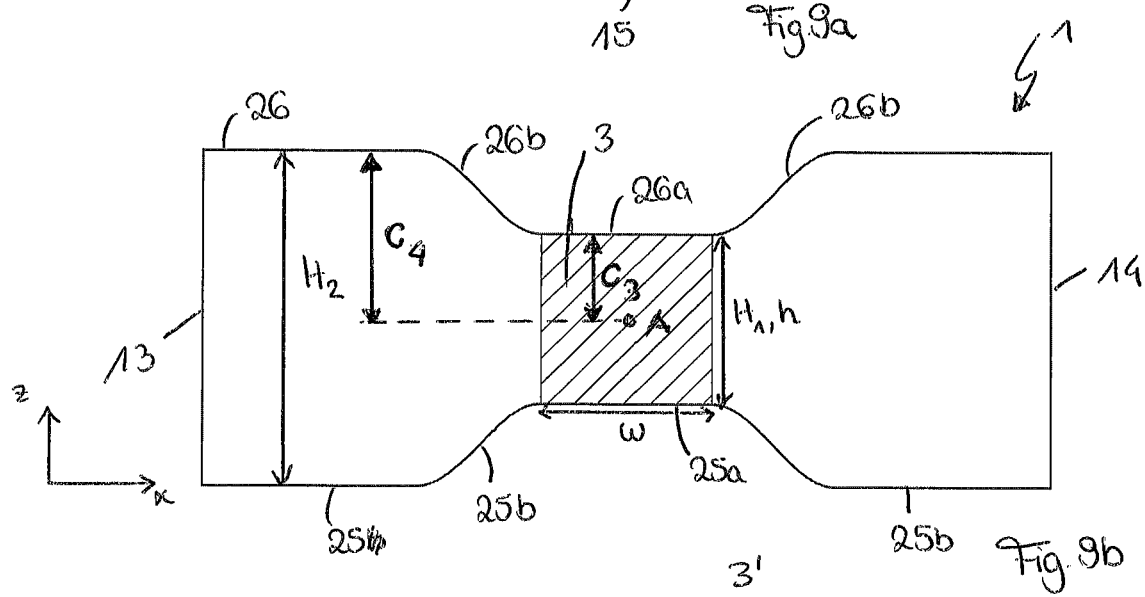
Figure 9C:
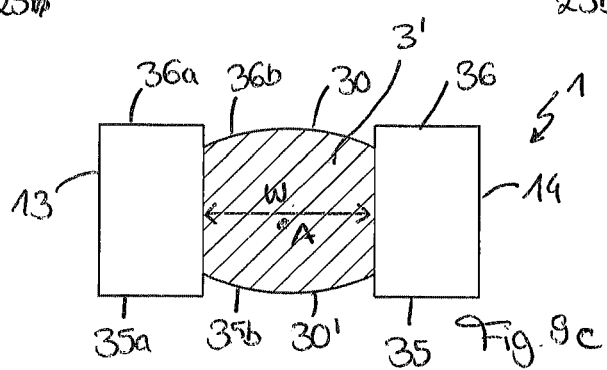
Figure 9D:
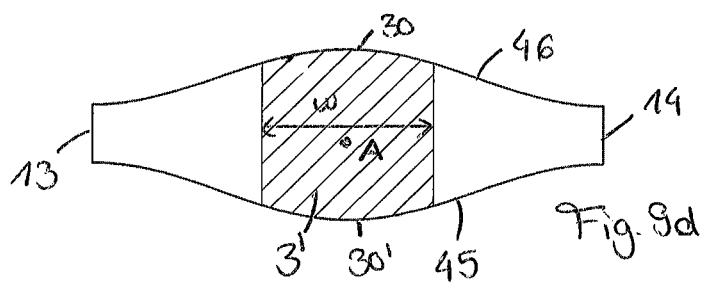

Examples of (re-)shaping the top and bottom walls of the housing 2 are shown in FIGS. 9b to 9d. FIG. 9a shows a cut (x-z-plane) through a typical rectangular housing with a constant height H.

In order to implement a standing microwave field with low resonance frequencies, the width W of the housing 2 (i.e. of the resonant cavity formed by the housing 2) is usually widened. However, alternatively the height H of the housing 2 (i.e. of the resonant cavity) can be increased at lateral positions between the crystalline block 3 and the lateral walls 13, 14.

This is depicted by FIG. 9b, which shows an electro-optic modulator with a top wall 26 that comprises a regular (non-deformed) portion 26a and a deformed portion 26b and a bottom wall 25 that comprises a regular (non-deformed) portion 25a and a deformed portion 25b. The regular portions 26a, 25a extend at least over the entire width w of the crystalline block 3 in the x-direction and form a central portion of the housing 2 having a first height $H_1$ which corresponds to the height h of the crystalline block 3. Second portions of the housing are formed by the deformed portions 25b, 26b, which second portions have a second height $H_2$ that exceeds the first height $H_1$ of the central portion and which second portions are located beside the crystalline block 3 in x-direction, i.e. they are located adjacent to the lateral walls 13, 14. Consequently, the regular portions 25a, 26a have a first distance $c_3$ from the beam axis A and the deformed portions have a second distance $c_4$ from the beam axis A, wherein $c_3=H_1/2$ and $c_4=H_2/2$ and the second distance $c_4$ of the deformed portions 25b, 26b exceeds the first distance $c_3$ of the regular portions 25a, 26a.

The second height $H_2$ between the deformed portions 25b, 26b of the top and bottom walls 26, 25 can vary along the x- and/or y-direction. Alternatively, only one of the top wall 26 or the bottom wall 25 can comprise deformed portions.

Advantages that can be achieved by increasing the height H of the housing 2 at lateral positions between the crystalline block 3 and the lateral walls 13, 14 instead of widening the width W of the housing for are, for example, a more compact design of the housing 2, a higher microwave field strength within the crystal and that the height h of the crystalline block 3 does not have to exceed the aperture required by the laser beam.

A fourth embodiment of an electro-optic modulator 1 according to the invention is shown in FIGS. 9c, 9d. In FIGS. 9c and 9d, the top and bottom walls 36, 35 and 46, 45 are shaped so as to comprise deformed portions 35b, 36b, 45, 46. The deformed portions 35b, 36b, 45, 46 each have a substantially convex shape in x-direction and extend over the width w of the crystalline block 3' along the x-direction such that the height of the housing 2 varies along the width w of the crystalline block 3'. The top and bottom walls 36, 35 can further comprise regular (non-deformed) portions 36a, 35a arranged beside the deformed portions 36b, 35b in x-direction, as shown in FIG. 9c. Alternatively, the entire top and bottom walls 46, 45 can be designed as deformed portions as shown in FIG. 9d.

The crystalline block 3' is (re-)shaped such that it adapts to the shape of the deformed portions 35b, 36b, 45, 46 of the top and bottom walls of the housing 2, i.e. the crystalline block 3' comprises a deformed top portion 30 and a deformed bottom portion 30' that adapt to the form of deformed portions 35b, 36b, 45, 46 of the top and bottom walls 36, 35, 45, 46. This means that the outer surface of the crystalline block 3' is shaped complementary to the respective inner surface of the housing 2 such that the distance between the surface of the crystalline block 3' and the respective wall of the housing 2 is substantially constant, which also includes a distance equal to zero (see FIGS. 9c, 9d). Thus, the variation of the electric field strength along the x-direction can be reduced as compared to a rectangular crystalline block 3. In particular, this arrangement leads to a reduction of the variation of the electric field strength $E_z$ along the x-direction. This leads to a reduction in disturbing side-effects such as optical lensing and deflection along the x direction.

The features of the embodiments described above can be combined among each other. In general, distortions of the standing microwave field caused by the coupling mechanism are compensated by (re-)shaping the walls (lateral and top and bottom walls as well as front and rear faces) of the housing 2 with respect to their length and/or height and/or width. The respective parameters can be optimized numerically by means of simulations of the electro-magnetic field in order to minimize field distortions.

Figure 10A:
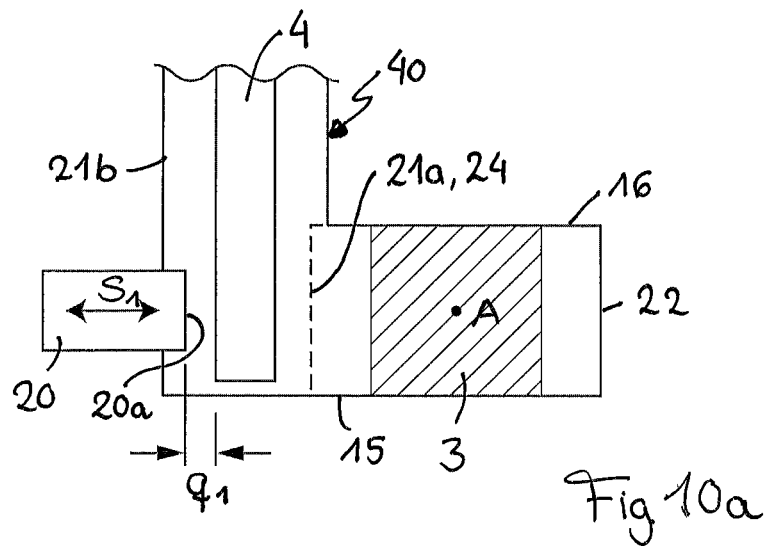
FIG. 10a and FIG. 10b are schematic cross-sectional views in the x-z-plane of a resonant standing wave electro-optic modulator according to a sixth embodiment of the invention.
Figure 10B:
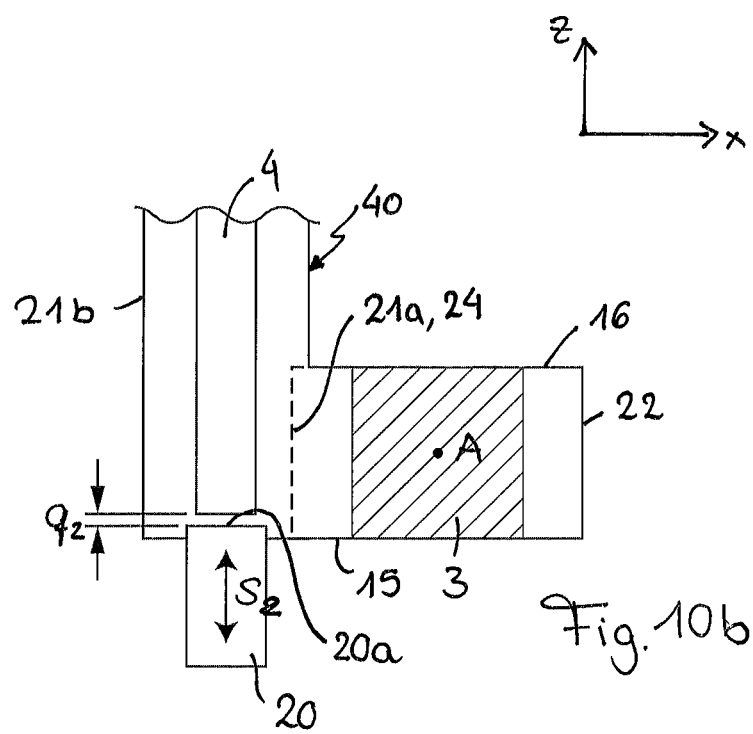

In a further embodiment of the invention shown in FIG. 10a and FIG. 10b, an impedance matching screw 20 is provided at the deformed portion 21b of the lateral wall 21 that accommodates the rod 4. The impedance matching screw 20 serves as an impedance matching element and comprises a first end 20a that has a distance $q_1$ from the rod 4 in x-direction, i.e. perpendicular to the beam axis A and perpendicular to a length of the rod 4 in z-direction in the example shown in FIG. 10a. Alternatively, the impedance matching screw is provided at the bottom wall 15 of the housing 2 and its first end 20a has a distance $q_2$ from the rod 4 in z-direction, i.e. perpendicular to the beam axis A and parallel to a length of the rod in (FIG. 10b). The impedance matching screw 20 is preferably made of a metallic material and can be moved in the x-direction (represented by the arrow $S_1$) in FIG. 10a and can be moved in the z-direction (represented by the arrow $S_2$) in FIG. 10b so as to adjust the distance $q_1$, $q_2$ between the rod 4 and the first end 20a. The first end 20a can be a tip.

The impedance matching element is not limited to a screw. The impedance matching element can rather be any element, such as a rod or a pin or any other element, that has a first end that has a distance from the rod and wherein the distance can be adjusted.

By precisely adjusting the distance $q_1$, $q_2$ between the rod 4 and the first end 20a of the impedance matching screw 20 the inductance and/or capacitance of the coupling can be adjusted to provide optimal impedance matching, in particular without moving the rod 4 itself in the x-, y- and/or z-direction. The rod 4 can also be placed with its bottom end into a recess formed at the bottom wall 15. The relative orientation of the rod 4 and the impedance matching element is not limited to the two examples of FIG. 10a and FIG. 10b. The rod and the impedance matching element can be oriented in any other way that is suited, as long as a distance between them can be adapted, because the mutual distance between the coupling rod and the impedance matching element is important and not their relative orientation. The choice of orientation results from practical consideration such as mechanical stability, accessibility etc.

The impedance matching screw 20 can also be provided at the rod 4 of a resonant standing wave electro-optic modulator 1 without deformed (i.e. without (re-)shaped) sidewalls.

The shape of the deformed portions and deformed sidewalls is not limited to the shapes shown in the above embodiments. Furthermore, it is also possible to provide more than one deformed portion at a sidewall along the beam axis A. The general shape of the housing can differ from a rectangular shape, the housing can, for example, be cylindrically-shaped wherein the cylinder wall is coaxial to the beam axis or it can have any other shape.

Within the scope of the present invention, any shape of the sidewalls is conceivable that results in an improvement of the standing microwave field within the housing or the crystalline block, in particular which reduces distortions caused by the microwave coupling mechanism.

In the embodiments described above, the crystalline block and the beam axis are centered within the resonant cavity formed by the housing. However, it is also possible that the crystalline block and/or the beam axis are not centered within the resonant cavity formed by the housing. In this case, the displacement and deformed portions of the sidewalls may be described in terms of a (central) axis of the housing or of the crystalline block instead of the beam axis.

The invention claimed is:

1. An electro-optic modulator for modulating a beam of electro-magnetic radiation having a beam path and a beam axis, wherein the electro-optic modulator is of a transverse type and comprises:
    a modulator element that is positioned in the beam path,
    a housing for receiving the modulator element, which housing forms a single resonant cavity, the housing having a first end and a second end and extending along the beam path over a length from the first end to the second end, and the length exceeds a width of the housing perpendicular to its length, and
    a coupling device for inputting modulating energy into the housing such that a resonant standing wave with an electric field vector of the standing wave being perpendicular to the beam axis is generated within the housing, the coupling device comprising a rod-shaped element that extends into the housing,
    wherein the housing comprises at least one sidewall that extends substantially parallel to the beam axis over the length of the housing from the first end to the second end, and
    wherein the at least one sidewall comprises a deformed portion such that in the resonant cavity a distance between the sidewall and the beam axis in a direction perpendicular to the beam axis spatially varies along at least a portion of the length of the sidewall, wherein the deformed portion accommodates the coupling device.

2. The electro-optic modulator of claim 1, wherein the housing comprises four sidewalls each extending substantially parallel to the beam axis over a length and a front and a rear face arranged substantially perpendicular to the beam axis.

3. The electro-optic modulator of claim 1, wherein at least one sidewall of the housing comprises at least one deformed portion and at least one non-deformed portion, wherein the deformed portion has a second distance from the beam axis and the non-deformed portion has a first distance from the beam axis and the second distance exceeds the first distance.

4. The electro-optic modulator of claim 3, wherein the deformed portion is configured to accommodate the coupling device such that the coupling device is arranged beyond an extension of the non-deformed portion away from the beam axis.

5. The electro-optic modulator of claim 1, wherein the deformed portion of the at least one sidewall locally reduces or enlarges the size of the resonant cavity in a direction perpendicular to the beam axis.

6. The electro-optic modulator of claim 1, wherein the deformed portion of the at least one sidewall locally displaces the resonant cavity in a direction perpendicular to the beam axis.

7. The electro-optic modulator of claim 1, wherein at least two sidewalls of the housing comprise deformed portions, which sidewalls are arranged on opposite sides of the modulator element.

8. The electro-optic modulator of claim 1, wherein the at least one deformed portion of the at least one sidewall is configured to influence the resonant standing wave field of modulating energy.

9. The electro-optic modulator of claim 1, wherein the deformed portion is located at or near the position of the coupling device along the beam axis.

10. The electro-optic modulator of claim 1, wherein the deformed portion reduces the effective length of the modulator element along the beam axis.

11. The electro-optic modulator of claim 1, wherein a geometrical form of the modulator element corresponds to a geometrical form of the deformed portion.

12. The electro-optic modulator of claim 1, further having an impedance matching element that comprises a first end, wherein a distance between the first end of the impedance matching element and the coupling device can be adjusted.

13. The electro-optic modulator of claim 1, wherein the rod-shaped element is located within a space formed between the housing and the modulator element and extends substantially parallel to a height H of the resonant cavity.

14. The electro-optic modulator of claim 1, wherein the at least one deformed portion of the at least one sidewall is configured to compensate for distortions of the resonant standing wave field of modulating energy.

15. The electro-optic modulator of claim 1, wherein the housing defines a waveguide for the resonant standing wave and wherein the deformed portion is selected so as to define a local waveguide width and a local waveguide displacement at a position of the deformed portion.

16. A method of producing an electro-optic modulator for modulating a beam of electro-magnetic radiation having a beam path and a beam axis, wherein the electro-optic modulator is of a transverse type and comprises:
   a modulator element that is positioned in the beam path,
   a housing for receiving the modulator element, which housing forms a single resonant cavity, the housing having a first end and a second end and extending along the beam path over a length from the first end to the second end, and the length exceeds a width of the housing perpendicular to its length, and
   a coupling device for inputting modulating energy into the housing such that a resonant standing wave with an electric field vector of the standing wave being perpendicular to the beam axis is generated within the housing, the coupling device comprising a rod-shaped element that extends into the housing,
   wherein the housing comprises at least one sidewall that extends substantially parallel to the beam axis over the length of the housing from the first end to the second end, and
   wherein the method comprises a step of adapting the shape of the at least one sidewall to form a deformed portion such that in the resonant cavity a distance between the sidewall and the beam axis perpendicular to the beam axis spatially varies along at least a portion of the length of the sidewall, wherein the deformed portion accommodates the coupling device.

17. An electro-optic modulator for modulating a beam of electro-magnetic radiation having a beam path and a beam axis, wherein the electro-optic modulator is of a transverse type and comprises:
   a modulator element that is positioned in the beam path,
   a housing for receiving the modulator element, which housing forms a resonant cavity,
   a coupling device for inputting modulating energy into the housing such that a resonant standing wave is generated within the housing, the coupling device comprising a rod-shaped element that extends into the housing, and
   an impedance matching element that comprises a first end, wherein a distance between the first end of the impedance matching element and the coupling device can be adjusted, and
   wherein the housing comprises at least one sidewall that extends substantially parallel to the beam axis over a length of the housing, the at least one sidewall comprising a deformed portion that accommodates the coupling device.

18. The electro-optic modulator of claim 17, wherein the coupling device substantially extends to a bottom of the housing and wherein the impedance matching element is an element that can be moved along an axis, such as a screw.

19. The electro-optic modulator of claim 17, wherein adjustment of the distance provides for matching the impedance of the modulator element to the impedance of a feed line for supplying modulating energy and/or for improving coupling of the modulating energy into the housing.

* * * * *